United States Patent [19]

Lipson et al.

[11] Patent Number: 4,687,306
[45] Date of Patent: Aug. 18, 1987

[54] TUBULAR EYEGLASS FRAME

[76] Inventors: Erik Lipson, 8602 Hidden Hill La., Potomac, Md. 20854; Melanie J. Sansom Smith, 1740 East West Hwy., Silver Spring Md. 20910

[21] Appl. No.: 902,451
[22] PCT Filed: Feb. 25, 1986
[86] PCT No.: PCT/US86/00405
  § 371 Date: Aug. 22, 1986
  § 102(e) Date: Aug. 22, 1986
[87] PCT Pub. No.: WO86/05001
  PCT Pub. Date: Aug. 28, 1986
[51] Int. Cl.$^4$ .................. G02C 11/02; G02C 1/00
[52] U.S. Cl. .................. 351/51; 351/52; 351/83
[58] Field of Search .................. 351/43, 51, 52, 83

[56] References Cited

U.S. PATENT DOCUMENTS 4,541,696  9/1985  Winger et al. .................. 351/156 X

FOREIGN PATENT DOCUMENTS 3334437  8/1984  Fed. Rep. of Germany ........ 351/51
2388293  12/1978  France .................. 351/83
185015  11/1982  Japan .................. 351/155
466034  5/1937  United Kingdom .................. 351/51

Primary Examiner—Rodney B. Bovernick
Attorney, Agent, or Firm—Krass & Young

[57] ABSTRACT

An eyeglass frame (10) constructed of a single continuous hollow transparent thermoplastic tube configured to successively define a first temple piece (12), a first lens frame (14), a nose bridge portion (16), a second lens frame (18), and a second temple piece (20). The hollow inner chamber passage of the tube is filled with a colored liquid so as to impart the color of the liquid to the eyeglass frame. The free ends (24, 26) of the temple pieces (12,20) may be provided with removable plugs (28,30) so that the color of the liquid in the passage may be changed, or the free ends of the temple sections may be permanently sealed (12a) to permanently seal the liquid within the hollow passage. As a further alternative, a back piece (68) may be provided interconnecting the free ends of the temple pieces and formed of a similar tubular material so as to provide, in combination with the temple pieces, the lens frames, and the nose bridge portion, a continuous closed loop passage (70) so that the liquid in the passage may chase freely around the passage.

4 Claims, 10 Drawing Figures

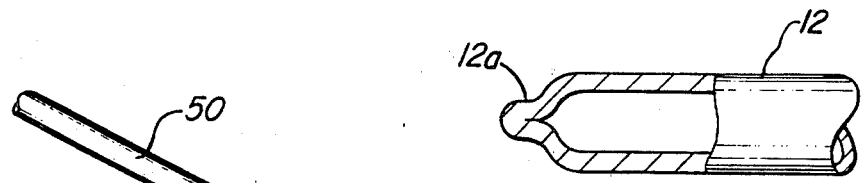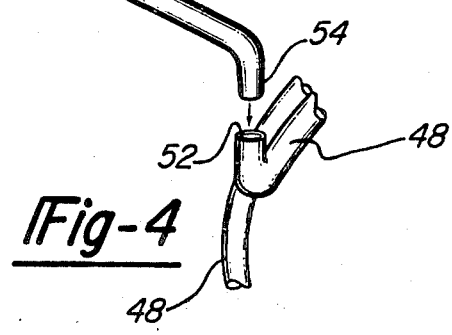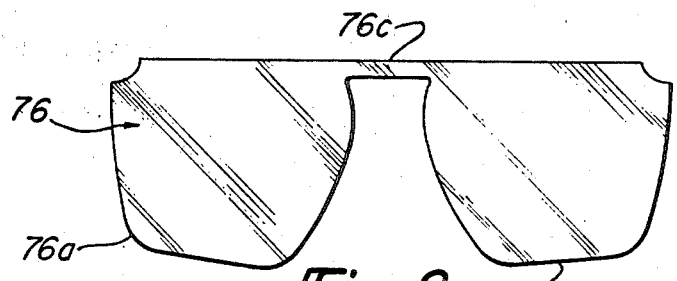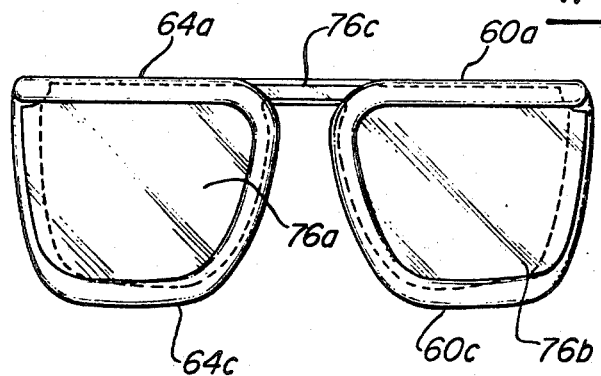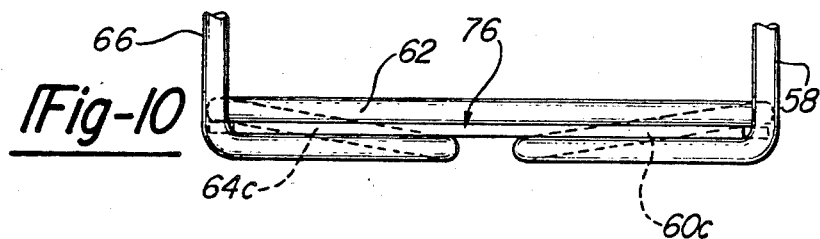

TUBULAR EYEGLASS FRAME

BACKGROUND OF THE INVENTION

This invention relates generally to eyeglasses and more particularly to an eyeglass frame which presents a striking ornamental appearance.

Eyeglasses are a necessary accessory to the many people who suffer from various forms of vision impairment. While eyeglass frames are available in a wide variety of styles and colors, eyeglass frames in general continue to have a form that closely follows function and continue to present a largely pragmatic appearance.

SUMMARY OF THE INVENTION

The present invention is directed to the provision of an eyeglass frame which is structured to provide a unique and striking ornamental effect.

The eyeglass frame of the invention is of the type including lens frame portions and temple portions. According to the invention, at least one of these portions is hollow and formed of a non-opaque material and a colored material is positioned within the hollow portion to impart the color of the material to the hollow portion.

According to a further feature of the invention, the eyeglass frame is made from a single, continuous piece of tubular plastic selectively configured to successively define the first temple portion, the first lens portion, the second lens portion, and the second temple portion so as to thereby define a single passage extending continuously through the frame portions.

According to a further feature of the invention, the colored material is a colored liquid and the respective free ends of the temple portions are sealed to trap the colored liquid within the continuous passage.

In one embodiment of the invention, the piece of tubular plastic is formed of a thermoplastic material and the ends of the temple portions are permanently sealed in a heat sealing operation.

In another embodiment of the invention, the free ends of the temple portions are temporarily sealed by plugs received in the free ends so that various colored liquids may be selectively injected into and removed from the continuous passage to provide a variety of appearances to the frame.

In another embodiment of the invention, the eyeglass frame further includes a tubular back portion interconnecting the free ends of the temple portions and coacting with the lens frame portions and the temple portions to define a continuous closed loop tubular passage. The colored liquid trapped in the passage is thus free to flow freely and totally around the eyeglass frame in response to movement of the frame on the head of the user.

According to a further aspect of the invention, glitter particles are dispersed in the colored liquid to heighten the ornamental effect provided by the eyeglass frame.

BRIEF DESCRIPTION OF THE DRAWINGS

FIG. 2 is a fragmentary view of a second embodiment of the invention;

FIG. 4 is a fragmentary perspective view a fourth embodiment of the invention;

FIG. 8 is a front view of a unitary lens which may be employed in conjunction with the eyeglass frames of the present invention;

FIG. 9 is a front view of an eyeglass frame of the invention with the lens of FIG. 4 installed; and FIG. 10 is a top view of the eyeglass frame and unitary lens of FIG. 9.

DETAILED DESCRIPTION OF THE PREFERRED EMBODIMENTS

Figure 1:
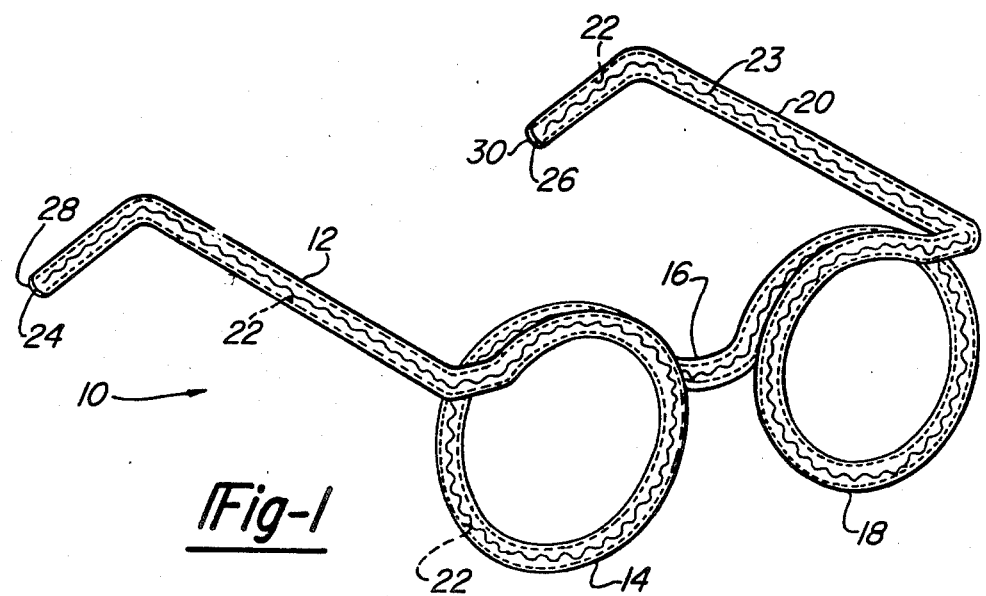
FIG. 1 is a perspective view of one embodiment of the present invention.

Referring to FIG. 1, the eyeglass frame 10 of the present invention preferably employs a continuous, hollow transparent tube formed into a first temple piece 12, a first lens frame 14, a nose bridge portion 16, a second lens frame 18, and a second temple piece 20. The frame is preferable made of a thermoplastic tubing which may be shaped or formed with the application of heat, but which ultimately sets into a relatively rigid form.

The tube forms a hollow passage 22 which runs through the entire length of the eyeglass frame. This passage is sealed at each of its open ends 24 and 26 with a pair of caps or plugs 28 and 30. The caps or plugs are preferably made of rubber, synthetic rubber or other plastic material which may be shaped to form a tight fit over or within the openings 24 and 26 in the tubular frame 10. If the wearer desires an eyeglass frame of a particular color, a liquid bearing that color, such as colored water, may be injected into the frame and the frame sealed with the caps 28 and 30 to retain the colored liquid therein. When the wearer desires to change the color of the eyeglass frame, one or both of the caps 28 and 30 may be removed, the liquid drained from the frame, the new color liquid added, and the caps 28 and 30 replaced.

As previously described, the hollow passage within the eyeglass frame may be filled with various substances in order to obtain different visual effects. For example, string or yarn 23 may be threaded through the inner passage of the frame 10. It should be noted that the string or yarn may be threaded completely through the tubular frame and the ends pulled out of the passage and tied in a knot or otherwise secured at each end in order to prevent movement of the string or yarn within the frame. For example, a piece of string or yarn significantly longer than the length of the passage 22 may be threaded through the passage 22, with each of the ends of the string or yarn extending out from the openings 24 and 26 in the temple pieces 12 and 20. The ends may then be tied together to provide a means for hanging the eyeglasses around the neck of the user when not in use. Other substances, such as a combination of vinegar and water, yarn with beads, or live ryne shrimp in water may be inserted into the passage 22. Similarly, the eyeglass 10 may be shaped into a variety of shapes or sizes without departing from the spirit of the present invention.

A second embodiment of the invention is seen fragmentarily in FIG. 2. In this embodiment, the respective ends of the temple pieces 12 and 20 are permanently sealed to permanently trap the flowable substance within the passage of the frame. Permanent sealing is performed preferably by heat sealing the respective ends as seen in 12a.

Figure 3:
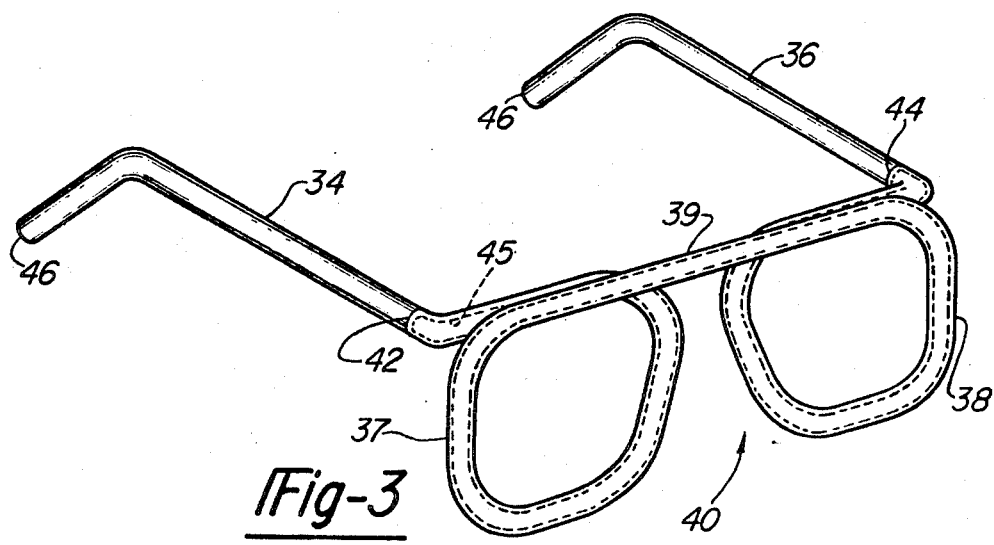
FIG. 3 is a perspective view of a third embodiment of the invention.

A third embodiment of the invention is seen in FIG. 3. In this embodiment, temple pieces 34 and 36 are formed of solid plastic rod material and the lens frame portions 37, 38 and bridge portion 39 are formed by a single tubular member 40 which may be accessed via a pair of openings 42 and 44 at the respective ends of the member 40. Each of the openings 42 and 44 may be capped in order to seal a selected color liquid or other substance within the hollow passage 45 of member 40. The temple pieces may be transparent, opaque, or translucent. It should be noted that one or both of the temple pieces 34 and 36 could also be fabricated from hollow transparent plastic tubing with caps placed in their open ends 46 if desired. If hollow tubing is used for one or both of the temple pieces 34, 36, the wearer then has the option of filling one or more of the different chambers with similar or contrasting substances in order to achieve a desired composite effect.

A fourth embodiment of the invention is seen in FIG. 4. In this embodiment, the lens frame portions and bridge portions are formed by a single tubular member 48 and the temple pieces 50 are joined to member 48 without the use of conventional metal hinges or fasteners. Specifically, the end 52 of tubular member 48 is formed so that it projects upwardly and the associated end 54 of temple piece 50 is formed so that it curves downwardly and is slightly smaller than the inside diameter of end 52. End 54 is inserted into the opening of end 52. The general vertical orientation of the opening 52 and the end 54 provides for rotation of the end 54 within the opening 52 in a direction which allows the temple piece 50 to fold toward tubular member 48 when the eyeglass frames are not in use. The chamber defined within the temple piece 50 is preferably closed at end 54 so that separate chambers are defined within each of the temple pieces 50 and within tubular member 48. End 54 also acts as a plug which seals the opening 52 of the tubular member 48.

Figure 5:
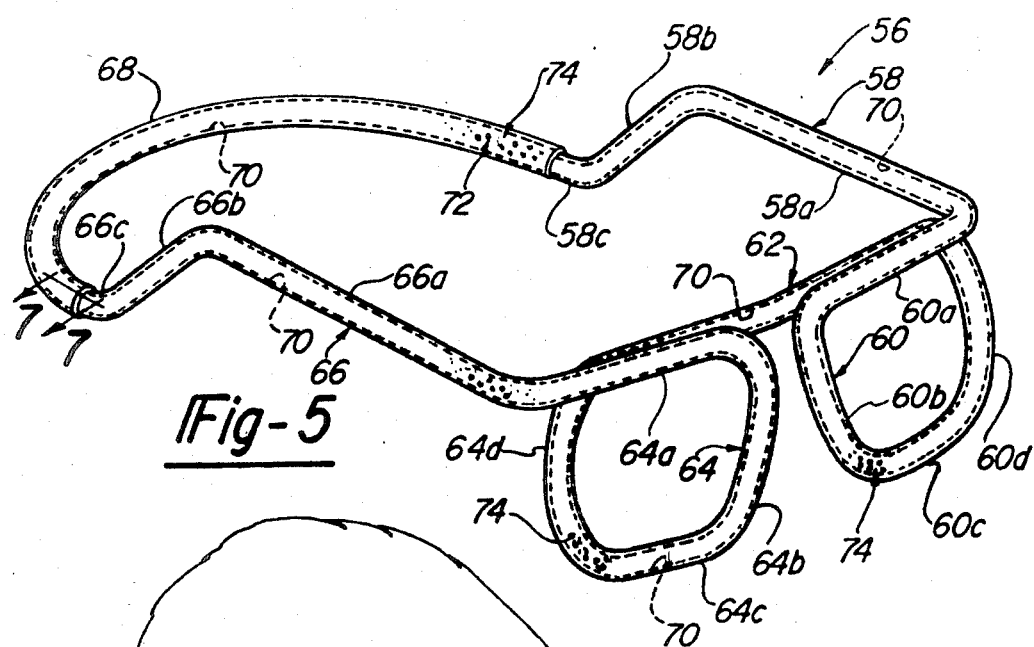
FIG. 5 is a perspective view of a fifth embodiment of the invention.
Figure 6:
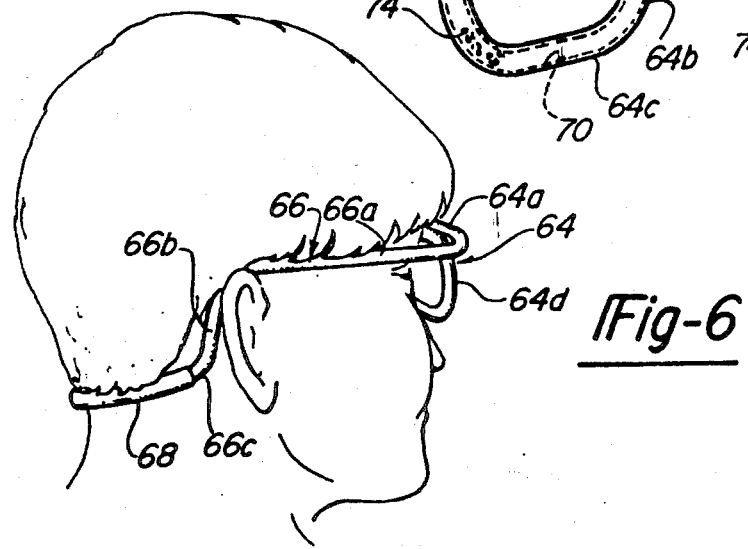
FIG. 6 is a view showing the eyeglass frame of FIG. 5 positioned on the head of a user.
Figure 7:
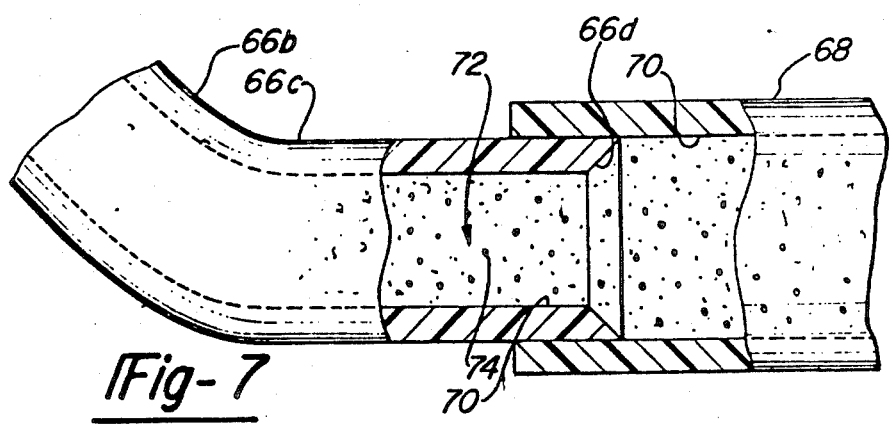
FIG. 7 is a detailed cross sectional view taken on line 7—7 of FIG. 5.

A fifth embodiment of the invention is seen in FIGS. 5-7. In this embodiment, the eyeglass frame 56 is in the form of a continuous non-opaque tube structure formed into a closed loop and including, successively, a first temple section 58, a first lens frame section 60, a bridge section 62, a second lens section 64, a second temple section 66 and a back section 68. The various sections combine to form a closed loop continuous tubular passage 70.

The tube structure comprises two separable tubular members with one member defining the back section 68 and the second member shaped into a continuous convoluted form to define, successively, the temple section 58, lens frame section 60, bridge section 62, lens frame section 64 and temple section 66. The tubing used for both members is preferably a transparent thermoplastic which may be shaped or formed with the application of heat and which ultimately sets it into a relatively rigid form.

Each temple section 58, 66 includes a straight temple portion 58a, 66a; a downturned ear portion 58b, 66b; and a connector portion 58c, 66c.

Each lens frame section 60, 64 includes an upper run portion 60a, 64a; an inner vertical portion 60b, 64b; an lower run portion 60c, 64c; and an outer vertical portion 60d, 64d.

The tubular stock forming the back member 68 has a larger cross section than the tubular stock forming the front portions of the frame so that the respective free ends of the temple sections may be telescopically received within the respective tubular open ends of back member 68. As best seen in FIG. 7, the end face of temple section 66 is preferably beveled at 66d to provide smooth flow as between sections 66 and 68 and the end face of temple section 58 is similarly beveled to provide smooth flow as between temple section 58 and the associated end of back section 68.

A suitable, visible, flowable substance 72 is positioned within continous closed loop tubular passage 70. This substance preferably comprises a flowable colored liquid and further preferably includes glitter particles 74 dispersed within the liquid. The colored liquid may comprise colored water and the glitter particles preferably comprise multi-colored metallic particles. The colored water or other liquid may totally fill the closed loop passage or may only partially fill the passage, depending upon the flow characteristics desired.

In use of the embodiment of FIGS. 5-7, and with the invention eyeglass frame positioned on the head of the user as seen in FIG. 6, movement of the head of the user occurring in the normal course of everyday activity will disturb the equalibrium of the liquid and glitter combination positioned within the tubular passage 70 and cause the liquid with the entrained glitter to move in a darting, chasing manner around and through passage 70. The liquid and entrained glitter moving through the tubular passage of the frame is particularly striking from an overall standpoint, and has the special effect of enhancing the eyes of the user as the glitter particles dance and chase around the eyes of the user as they move with the entrained liquid through the lens frame section 60 and 64. For added effect, the glitter particles may be made luminous or irridescent. Further, provision may be made to drain any particular combination of colored liquid and glitter from the continuous tubular passage so that a different colored liquid and/or glitter material may be loaded into the continuous tubular passage to create a different visual effect. This substitution may be accomplished by separating the back piece 68 from the remainder of the eyeglass frame or by the use of a suitable aperture and/or plug (not shown) positioned strategicly at some point around the continuous loop defined by the eyeglass frame. Alternatively, the back piece 68 may be permanently sealed to the remainder of the frame as by adhesive applied at the junctures of the temple sections and the backpiece.

The flow of the liquid and entrained glitter around the closed loop of the frame is facilitated by the beveled edge 66d at the inserted end of temple section 66 and by the similar beveled edge on the inserted end of temple section 58, and the flow of the liquid and glitter around the loop may be further facilitated by the addition of a suitable surfactant to the colored liquid to preclude clumping of the glitter particles.

The back piece 68 functions to interconnect the temple sections to thereby complete the closed loop passage 70; further functions as a guard which engages the back of the head of the user to preclude inadvertant dislodgement of the frame from the head of the user; and further functions as a hanging member so that the frame may be worn about the neck of the user with section 68 engaging the back of the neck to prevent droppage of the frame.

The eyeglass frames of the various disclosed embodiments of the invention may be used by themselves, without corrective lenses within the lens frames, in which case they function as a striking ornamental head piece. However, the invention eyeglass frames may also be used in combination with clear, corrective, or shaded lenses.

For example, as seen in FIGS. 8-10, a unitary lens 76 may be used with any of the invention frames. Lens 76 includes first and second lens members 76*a* and 76*b* and a bridge member 76*c* and is adapted to be inserted into the invention frame. For example, in the case of the eyeglass frame of FIGS. 5-7, the lens 76 is inserted between lens frames 60, 64 and bridge section 62. Lens 76 is held in its inserted position by seating engagement of the respective lower edges of lens members 76*a* and 76*b* on the lower runs 64*c* and 60*c* of lens frame sections 64 and 60. Lens 76 may also be sized to resilient bias the upper runs 64*a* and 60*a* of lens frame sections 64 and 60 away from bridge section 62 as it is inserted between the lens frames and the bridge section so that the lens is held with a spring force within the frame.

The eyeglass frame of the present invention may be fabricated from hollow tubing having a variety of configurations. While the illustrated embodiments utilize tubing having circular cross section, plastic tubing having rectangular, hexagonal or other cross sectional configurations may be employed if desired.

The invention eyeglass frame, whether employed by itself or in combination with corrective lenses, will be seen to impart a striking ornamental appearance to the head of the user and will be seen to provide this striking ornamental appearance at minimal cost and with utlimate simplicity.

Although preferred embodiments of the invention have been illustrated and described in detail it will be apparent that various changes may be made in the disclosed embodiments without departing from the scope or spirit of the invention.

What is claimed is:

1. An eyeglass frame of the type including first and second lens frame portions, a bridge portion interconnecting the lens frame portions, and pair of temple portions, the improvement wherein:
   (A) said lens frame portions and said bridge portion are formed of a non-opaque material;
   (B) a continuous passage extends through said lens frame portions and said bridge portion;
   (C) a colored material is positioned within said passage to impart the color of the material to said lens frame portions and said bridge portion;
   (D) said frame further includes a back portion interconnecting the free ends of the temple portions;
   (E) said lens frame portions, bridge portion, temple portions, and back portion are configured and interconnected to form a continuous closed loop tubular passage; and
   (F) said material is positioned in and around said closed loop passage.

2. An eyeglass frame according to claim 1 wherein:
   (G) said eyeglass frame is formed entirely of non-opaque material; and
   (H) said material is a colored liquid which is free to flow around said closing loop passage.

3. An eyeglass frame according to claim 2 wherein:
   (I) said material further includes glitter particles dispersed in said liquid.

4. A hollow tubular eyeglass frame comprising, when worn on the head of a user, a continuous closed loop passage extending along one temple, across the front of the head, along the other temple and around the back of the head to the one temple to complete the closed loop passage, said eyeglass frame being formed of a non-opaque material and having a visible flowable substance positioned within said closed loop passage so as to flow freely therearound.

* * * * *

UNITED STATES PATENT AND TRADEMARK OFFICE
CERTIFICATE OF CORRECTION

PATENT NO.   :   4,687,306

DATED        :   August 18, 1987

INVENTOR(S)  :   Erik Lipson et al

It is certified that error appears in the above-identified patent and that said Letters Patent is hereby corrected as shown below:

ON THE TITLE PAGE:          , the following should be inserted:
—Related U.S. Application Data
[63] PCT/US86/00405 is a continuation-in-part of Serial No. 705,244, February 25, 1985, now abandoned.—

Signed and Sealed this

Tenth Day of March, 1992

Attest:

HARRY F. MANBECK, JR.

*Attesting Officer*    *Commissioner of Patents and Trademarks*